United States Patent
Shen et al.

(10) Patent No.: US 12,410,089 B2
(45) Date of Patent: Sep. 9, 2025

(54) PROTECTIVE GLASS PLATE WITH THE PROPERTY OF IMPACT STRESS RESISTANCE

(71) Applicant: SICHUAN XUHONG OPTOELECTRONIC TECHNOLOGY CO., LTD., Sichuan (CN)

(72) Inventors: Zihan Shen, Sichuan (CN); Zaijin Liu, Sichuan (CN); Ruhua Gong, Sichuan (CN)

(73) Assignee: SICHUAN XUHONG OPTOELECTRONICS TECHNOLOGY CO., LTD., Sichuan (CN)

( * ) Notice: Subject to any disclaimer, the term of this patent is extended or adjusted under 35 U.S.C. 154(b) by 954 days.

(21) Appl. No.: 17/285,624

(22) PCT Filed: Feb. 21, 2019

(86) PCT No.: PCT/CN2019/075638
§ 371 (c)(1),
(2) Date: Jun. 2, 2021

(87) PCT Pub. No.: WO2020/077925
PCT Pub. Date: Apr. 23, 2020

(65) Prior Publication Data
US 2021/0380467 A1 Dec. 9, 2021

(30) Foreign Application Priority Data
Oct. 16, 2018 (CN) .......................... 201811201352.8

(51) Int. Cl.
*C03C 3/093* (2006.01)
*C03C 21/00* (2006.01)

(52) U.S. Cl.
CPC ............ *C03C 3/093* (2013.01); *C03C 21/002* (2013.01); *C03C 2203/52* (2013.01)

(58) Field of Classification Search
CPC .... C03C 3/85; C03C 3/87; C03C 3/91; C03C 21/002
See application file for complete search history.

(56) References Cited

U.S. PATENT DOCUMENTS

2008/0286548 A1* 11/2008 Ellison ................. C03C 21/002
428/220
2012/0052275 A1 3/2012 Hashimoto et al.
(Continued)

FOREIGN PATENT DOCUMENTS

CN 102574720 7/2012
CN 103459337 12/2013
(Continued)

OTHER PUBLICATIONS

International Search Report issued Jul. 23, 2019 in International (PCT) Application No. PCT/CN2019/075638.
(Continued)

*Primary Examiner* — Matthew E. Hoban
(74) *Attorney, Agent, or Firm* — Myers Wolin, LLC (57) ABSTRACT

A protective glass plate with the property of impact stress resistance, and the composition for making the protective glass plate comprising the following components by mass percent: $SiO_2$: 59-63.5%, $Al_2O_3$: 11.5-16.5%, $Na_2O$: 11.5-15.5%, $K_2O$: 0.8-6%, $MgO$: 4-8.5%, $B_2O_3$: 0-1.0%, and $ZrO_2$: 0%; when 0.3 mm<T<2.0 mm, and $0.5h \leq t \leq 8h$, CS satisfies the following relationship: $9.597\text{Ln}(t)+710 \leq CS \leq -5.299t^2+50.28t+765$; when 2.0 mm$\leq T \leq$4.0 mm, and $4h \leq t \leq 150h$, CS satisfies the following relationship: $0.003t^2-2.167t+858 \leq CS \leq -61.4\text{Ln}(t)+1060$; wherein T is the thickness of the glass plate and has the unit of mm; t is the chemical strengthening time and has the unit of h; and CS is
(Continued)

the surface compressive stress generated by chemical strengthening and has the unit of MPa. The protective glass plate has an excellent property of impact resistance, and the maximum glass fragment size of the broken glass may be controlled within the range of 10-30 mm in length and 1-3 mm in width, thus it is applicable for large-scale industrial production.

9 Claims, 2 Drawing Sheets

(56) References Cited

U.S. PATENT DOCUMENTS

| | | | |
|---|---|---|---|
| 2012/0083401 A1* | 4/2012 | Koyama | C03C 15/00 65/30.14 |
| 2013/0209773 A1* | 8/2013 | Endo | C03C 3/087 428/220 |
| 2014/0011035 A1 | 1/2014 | Senshu et al. | |
| 2016/0137550 A1 | 5/2016 | Murata et al. | |
| 2018/0118615 A1 | 5/2018 | Fukada et al. | |

FOREIGN PATENT DOCUMENTS

| | | |
|---|---|---|
| CN | 105050975 | 11/2015 |
| CN | 105800948 | 7/2016 |
| CN | 107935377 | 4/2018 |
| CN | 108314315 | 7/2018 |
| CN | 108623147 | 10/2018 |
| JP | 2012-148955 A | 8/2012 |
| JP | 2013-513537 A | 4/2013 |
| JP | 2013-116846 A | 6/2013 |
| JP | 2013-193887 | 9/2013 |
| WO | 2016/000540 A1 | 1/2016 |

OTHER PUBLICATIONS

Notice of Reasons for Refusal issued by the Japan Patent Office for Japanese Patent Application No. 2021-520998, dated Dec. 20, 2022, with an English machine translation.

Extended European search report with the Supplementary European search report and the European search opinion Issued by the European Patent Office for corresponding European Patent Application No. 19873346.1-1108, dated Jun. 7, 2022.

Communication pursuant to Article 94(3) EPC issued by the European Patent Office for corresponding European Patent Application No. 19873346.1, dated Jan. 20, 2025.

* cited by examiner

PROTECTIVE GLASS PLATE WITH THE PROPERTY OF IMPACT STRESS RESISTANCE

TECHNICAL FIELD

The present application relates to the field of glass plates, in particular to a protective glass plate with the property of impact stress resistance.

BACKGROUND ART

Chemically tempered glass is also called ion-exchange reinforced glass. Its principle is to change the composition of the glass surface according to the diffusion mechanism of ions, i.e., the alkali metal ions on the glass surface are replaced by different alkali metal ions in the molten salt, causing a layer of compressive stress on the glass surface, so as to achieve the purpose of improving the strength of the glass. Glass components, ion exchange temperature and time are the main factors that affect the strength of ion exchange. Compared with other enhancement methods, the ion exchange method makes the glass have the advantages of no deformation, high strength, divisibility, no self-explosion, impact resistance and increased surface wear resistance, and the processing technology is simple and the yield is high. Due to these advantages, ion-exchange chemically strengthened glass has been widely used in the fields of cover glass for protecting mobile smart devices, cover glass for protecting touch screens, and safety glass for protecting front windows or side windows of high-speed trains.

As the protective glass for mobile smart devices and touch screens, in recent years, there is a trend for large screens, for example, the screens of smart phones have changed from the traditional 4.5-inch to the mainstream 5-inch, 5.5-inch, or even 6-inch, 6.5-inch ultra-large screens. At the same time, the thickness of smart phones has also changed from the traditional 8.0 mm, 7.8 mm to the mainstream 7.2 mm, 7.0 mm, and even 6.5 mm, 5.5 mm ultra-thin thickness. Furthermore, as on-board touch screen glass or safety glass for protecting front windows or side windows of high-speed trains, in the event of an emergency, after the glass is shattered by impact, the glass fragments must be granular powder to protect the personal safety of passengers. In summary, stricter requirements are put forward on the strength, thickness, and broken form of the cover glass.

CONTENTS OF THE INVENTION

Increasing the strength of the glass by means of ion exchange has a significant strengthening effect on the glass surface. However, when chemically tempered glass products are broken, the fragments are usually larger. Currently most of the researchers simply consider improving the impact-resistance strength of the glass or how to ensure that after being impacted the form of the broken glass meets safety requirements. In addition, surface compressive stress (CS) is formed on the surface of glass after chemical strengthening. Currently most of the researchers only consider the relationship between surface compressive stress (CS) and depth of compressive stress or the relationship between surface compressive stress (CS) and glass strength.

In actual production, the properties of chemically tempered glass should be fully considered to obtain high-strength chemically strengthened glass with small broken particles.

In order to overcome the above-mentioned shortcomings in the prior art, the inventors use the materials of the glass plate according to the present application and repeatedly adjust the conditions of the preparation process, thereby obtaining a linear functional relationship between the three of surface compressive stress (CS), chemical strengthening time (t), and the thickness of the glass plate (T) after the glass plate is chemically strengthened. In addition, the inventors also combine this function with the impact resistance of the glass and the form of the broken glass to provide a protective glass plate with the property of impact stress resistance. The glass plate according to the present application has excellent impact resistance and the size of the glass particles of the broken glass may be controlled in some degree. The technical solution of the present application consists of the following:

In the first aspect, the present application provides a protective glass plate with the property of impact stress resistance, which is characterized in that the composition for making the glass plate comprises the following components by mass percent: $SiO_2$: 59-63.5%, $Al_2O_3$: 11.5-16.5%, $Na_2O$: 11.5-15.5%, $K_2O$: 0.8-6%, $MgO$: 4-8.5%, $B_2O_3$: 0-1.0%, and $ZrO_2$: 0%;

when 0.3 mm<T<2.0 mm, and 0.5h≤t≤8h, CS satisfies the following relationship:

$$9.597\mathrm{Ln}(t)+710 \leq CS \leq -5.299t^2+50.28t+765;$$

wherein T is the thickness of the glass plate and has the unit of mm; t is the chemical strengthening time and has the unit of h; and CS is the surface compressive stress generated by chemical strengthening and has the unit of MPa; and Ln is the natural logarithm.

Preferably, the glass thickness is 0.3 mm<T≤1.1 mm; more preferably, the glass thickness is 0.6 mm≤T≤0.9 mm.

Preferably, by mass percent, it comprises $B_2O_3$: 0.2-0.7%; more preferably, it comprises $B_2O_3$: 0.2-0.6%; still more preferably, it comprises $B_2O_3$: 0.3-0.6%; most preferably, it comprises $B_2O_3$: 0.4-0.6%.

Preferably, by mass percent, it comprises $SiO_2$: 59.5-62.5%; more preferably, it comprises $SiO_2$: 59.5-62%; still more preferably, it comprises $SiO_2$: 59.8-61.8%; most preferably, it comprises $SiO_2$: 59.8-61.6%.

Preferably, by mass percent, it comprises $Al_2O_3$: 13.1-16.5%; more preferably, it comprises $Al_2O_3$: 13.5-16.3%; still more preferably, it comprises $Al_2O_3$: 13.8-16%; most preferably, it comprises $Al_2O_3$: 13.8-15.8%.

Preferably, by mass percent, it comprises $Na_2O$: 12.5-14.8%; more preferably, it comprises $Na_2O$: 12.5-14.5%; still more preferably, it comprises $Na_2O$: 12.8-14.5%.

Preferably, by mass percent, it comprises $K_2O$: 0.8-5.8%; more preferably, it comprises $K_2O$: 1.8-5.8%; still more preferably, it comprises $K_2O$: 3.1-5.8%; most preferably, it comprises $K_2O$: 4.5-5.8%.

Preferably, by mass percent, it comprises $MgO$: 5-7.5%; more preferably, it comprises $MgO$: 5.1-7.4%: still more preferably, it comprises $MgO$: 5.1-7.2%.

Preferably, by mass percent, it comprises: $SiO_2$: 59.5-62.5%, $Al_2O_3$: 11.5-16.5%, $Na_2O$: 11.5-15.5%, $K_2O$: 0.8-5.8%, $MgO$: 5-7.5%, and $B_2O_3$:0-1.0%.

Preferably, by mass percent, it comprises: $SiO_2$: 59.5-62.5%, $Al_2O_3$: 13.1-16.5%, $Na_2O$: 12.5-14.8%, $K_2O$: 0.8-5.8%, $MgO$: 5-7.5%, and $B_2O_3$: 0.2-0.7%.

More preferably, by mass percent, it comprises: $SiO_2$: 59.8-61.6%, $Al_2O_3$: 13.8-15.8%, $Na_2O$: 12.8-14.5%, $K_2O$: 4.5-5.8%, $MgO$: 5.1-7.2%, and $B_2O_3$: 0.4-0.6%.

Preferably, the chemical strengthening temperature is 380-450° C.

Preferably, the ratio of $K_2O/Al_2O_3$ in the composition for making the glass plate should not be greater than 0.5; more preferably, the ratio of $K_2O/Al_2O_3$ in the glass plate should not be greater than 0.35.

Preferably, the maximum fragment size of the broken glass plate is: 10-30 mm in length, and 1-3 mm in width; more preferably, the maximum fragment size of the broken glass plate is: 10-20 mm in length, and 1-2 mm in width.

In the second aspect, the present application provides a protective glass plate with the property of impact stress resistance, which is characterized in that the composition for making the glass plate comprises the following components by mass percent: $SiO_2$: 59-63.5%, $Al_2O_3$: 11.5-16.5%, $Na_2O$: 11.5-15.5%, $K_2O$: 0.8-6%, MgO: 4-8.5%, $B_2O_3$: 0-1.0%, and $ZrO_2$: 0%;

when 2.0 mm≤T<4.0 mm, and 4h≤t≤150h, CS satisfies the following relationship:

$$0.003t^2-2.167t+858 \leq CS \leq -61.4Ln(t)+1060;$$

wherein T is the thickness of the glass plate and has the unit of mm; t is the chemical strengthening time and has the unit of h; CS is the surface compressive stress generated by chemical strengthening and has the unit of MPa; and Ln is the natural logarithm.

Preferably, the glass thickness is 2.5 mm≤T≤3.5 mm.

Preferably, by mass percent, it comprises $B_2O_3$: 0.2-0.7%; more preferably, it comprises $B_2O_3$: 0.2-0.6%; still more preferably, it comprises $B_2O_3$: 0.3-0.6%; most preferably, it comprises $B_2O_3$: 0.4-0.6%.

Preferably, by mass percent, it comprises $SiO_2$: 59.5-62.5%; more preferably, it comprises $SiO_2$: 59.5-62%; still more preferably, it comprises $SiO_2$: 59.8-61.8%; most preferably, it comprises $SiO_2$: 59.8-61.6%.

Preferably, by mass percent, it comprises $Al_2O_3$: 13.1-16.5%; more preferably, it comprises $Al_2O_3$: 13.5-16.3%; still more preferably, it comprises $Al_2O_3$: 13.8-16%; most preferably, it comprises $Al_2O_3$: 13.8-15.8%.

Preferably, by mass percent, it comprises $Na_2O$: 12.5-14.8%; more preferably, it comprises $Na_2O$: 12.5-14.5%; still more preferably, it comprises $Na_2O$: 12.8-14.5%.

Preferably, by mass percent, it comprises $K_2O$: 0.8-5.8%; more preferably, it comprises $K_2O$: 1.8-5.8%; still more preferably, it comprises $K_2O$: 3.1-5.8%; most preferably, it comprises $K_2O$: 4.5-5.8%.

Preferably, by mass percent, it comprises MgO: 5-7.5%; more preferably, it comprises MgO: 5.1-7.4%; still more preferably, it comprises MgO: 5.1-7.2%.

Preferably, by mass percent, it comprises: $SiO_2$: 59.5-62.5%, $Al_2O_3$: 11.5-16.5%, $Na_2O$: 11.5-15.5%, $K_2O$: 0.8-5.8%, MgO: 5-7.5%, and $B_2O_3$: 0-1.0%.

Preferably, by mass percent, it comprises: $SiO_2$: 59.5-62.5%, $Al_2O_3$: 13.1-16.5%, $Na_2O$: 12.5-14.8%, $K_2O$: 0.8-5.8%, MgO: 5-7.5%, and $B_2O_3$: 0.2-0.7%.

Preferably, by mass percent, it comprises: $SiO_2$: 59.8-61.6%, $Al_2O_3$: 13.8-15.8%, $Na_2O$: 12.8-14.5%, $K_2O$: 4.5-5.8%, MgO: 5.1-7.2%, and $B_2O_3$: 0.4-0.6%.

Preferably, the chemical strengthening temperature is 400-450° C.; more preferably, the chemical strengthening temperature is 420° C.

Preferably, the ratio of $K_2O/Al_2O_3$ in the composition for making the glass plate should not be greater than 0.5; more preferably, the ratio of $K_2O/Al_2O_3$ in the glass plate should not be greater than 0.35.

Preferably, the maximum fragment size of the broken glass plate is: 10-30 mm in length, and 1-3 mm in width; more preferably, the maximum fragment size of the broken glass plate: 10-20 mm in length, and 1-2 mm in width.

Due to the large ion radius of $Zr^{4+}$, it belongs to the outside body in the glass structure. The solubility of $ZrO_2$ in silicate glass is small, so it is easy to cause the viscosity of the glass to increase.

The glass components of the present application do not comprise $ZrO_2$, thereby ensuring the drawing and molding of thin-plate glass, especially the drawing and molding of ultra-thin glass (thickness is generally 0.3-0.4 mm).

For the two protective glass plates of the present application with a thickness greater than 0.3 mm and less than 2 mm and a thickness greater than or equal to 2 mm and less than or equal to 4 mm, since they are prepared by using the raw material ratio according to the present application, they have the properties of good stability, high hardness, high weather resistance, homogeneity, high chemical strengthening performance, good impact resistance, high transparency and gloss, low crack generation rate; and the molten glass has low viscosity and good meltability, and the ion exchange speed during the chemical strengthening process of the glass is increased.

In the protective glass substrate with property of impact stress resistance according to the present application, by limiting the mass ratio of $K_2O/Al_2O_3$, higher liquid phase viscosity and higher ion exchange performance may be achieved at the same time, and a protective glass plate with further optimized property of impact stress resistance may also be obtained.

The glass plate according to the present application has the ability to withstand impact damage test. The form of the broken glass is strip or powder particle with relatively uniform size, and the size of the broken glass strip or powder particle decreases with the increase of the ion exchange time t. The size of the fragments of the broken glass is relatively uniform because the obtained depth of surface stress for the protective glass plate is sufficient, so that the crack propagation is stable before the glass plate reaches the breaking strength, and the crack propagates slowly to the inside of the glass, but rapidly propagates on the surface of the glass. The small size of the maximum fragment of the broken glass indicates that the protective glass plate prepared by the present application has high crack resistance.

Limiting the chemical strengthening temperature within the scope of the present application, a greater depth of surface compressive stress layer may be obtained, so that the glass has better strengthening performance, and thus has more excellent property of impact stress resistance.

For the protective glass plate with a thickness greater than 0.3 mm and less than 2 mm, its main application is the protective glass for mobile smart devices and touch screens. When the thickness is greater than or equal to 0.6 mm and less than or equal to 0.9 mm, it has ultra-thin performance and excellent impact resistance performance.

For the protective glass plate with a thickness greater than or equal to 2 mm and less than or equal to 4 mm, it may be applied as glass of on-board touch screen or as safety glass for protecting high-speed train front and side windows. The protective glass plate according to the present application has extremely high safety performance, and it may make on-board touch screens and high-speed train windows have higher mechanical strength and impact resistance strength. When damaged and broken by an external impact, the size of the glass fragments is small and relatively uniform, and may be controlled within the range of 10-30 mm in length and 1-3 mm in width, thus it has high safety. As the window glass of a high-speed train, the glass according to the present application has high homogeneity, thereby ensuring the same refractive index everywhere, so that during the high-speed train operation, passengers are prevented from dazzling and dizziness, and they have a better sightseeing field of vision.

For a protective glass plate with a thickness greater than 0.3 mm and less than 2 mm, in case that the chemical strengthening conditions and the glass thickness are basically the same, the height of a single-point falling ball of the protective glass plate according to the present application may be increased by up to 5 times compared with the Comparative Examples.

For a protective glass plate with a thickness greater than or equal to 2 mm and less than or equal to 4 mm, in case that the chemical strengthening conditions and the glass thickness are basically the same, the surface compressive stress of the protective glass plate according to the present application may be increased by up to 15% compared with the Comparative Examples; the depth of compressive stress layer may be increased significantly, up to 45%.

The glass plate according to the present application is used for cover glass for protecting mobile smart devices, cover glass for protecting touch screens, and safety glass for protecting front windows or side windows of high-speed trains.

SPECIFIC EMBODIMENTS

As used in the present application, the term "surface compressive stress (CS)" means when the glass is chemically strengthened, it is placed in a molten salt so that the cations having a smaller radius on the surface layer of the glass exchange with the cations having a larger radius in the molten salt. Finally, a compressive stress layer is formed on the two outer surfaces of the glass, and a compressive stress is formed on the surface of the ordinary glass. The strengthened glass first offsets the surface compressive stress when it is subjected to external forces, thereby improving the bearing capacity and enhancing the glass's own resistance to wind pressure, cold and hot, impact and so on. The compressive stress layer is the "surface compressive stress layer" of chemically strengthened glass.

As used in the present application, the term "depth of compressive stress layer (DOL)" refers to the depth at which the cations having a larger radius in the molten salt exchange with the cations having a smaller radius in the glass during the chemical strengthening process of the glass.

As used in the present application, the term "chemical strengthening time (t)" refers to the time for the glass to undergo chemical strengthening treatment, i.e., the time for the cations having a larger radius in the molten salt to exchange with the cations having a smaller radius in the glass.

One technical solution according to the present application is: a protective glass plate with the property of impact stress resistance, by mass percent, the composition for making the glass plate comprises: $SiO_2$: 59-63.5%, $Al_2O_3$: 13.1-16.5%, $Na_2O$: 11.5-15.5%, $K_2O$: 0.8-6%, MgO: 5-7.5%, $B_2O_3$: 0-1.0%, and $ZrO_2$: 0%. Its thickness (T) is greater than 0.3 mm and less than 2 mm; the chemical strengthening time t is greater than or equal to 0.5 hours and less than or equal to 8 hours; the chemical strengthening temperature is: 380-450° C.; and the surface compressive stress value (CS) after chemical strengthening satisfies the relationship: $9.597 Ln\,(t)+710 \le CS \le -5.299t^2+50.28t+765$, wherein Ln is the natural logarithm. After a certain time of chemical strengthening, for the two expressions of the endpoints, the values at that time are calculated respectively, and the surface compressive stress (CS) of the glass plate is between the two values.

The surface compressive stress (CS) is preferably 700 MPa or more and not more than 850 MPa, more preferably 750 MPa or more and not more than 850 MPa; the depth of compressive stress layer (DOL) is preferably 30 μm or more, more preferably 35 μm or more.

As a preferred technical solution, the thickness of the glass is greater than or equal to 0.6 mm and less than or equal to 0.9 mm.

In addition, as a technical solution of the present application, the composition for making the protective glass plate with the property of impact stress resistance, by mass percent, comprises: $SiO_2$: 59.5-62.5%, $Al_2O_3$: 13.8-15.8%, $Na_2O$: 11.5-15.5%, $K_2O$: 4.5-5.8%, MgO: 5-7.5%, $B_2O_3$: 0.4-0.6%, and $ZrO_2$: 0%.

As a preferred technical solution, the ratio of $K_2O$ to $Al_2O_3$ in the composition for making the glass plate is less than or equal to 0.5; and the size of the maximum fragment for the broken glass is: 10-20 mm in length, and 1-2 mm in width.

Another technical solution of the present application is: a protective glass plate with the property of impact stress resistance, by mass percent, the composition for making the glass plate comprises: $SiO_2$: 59-63.5%, $Al_2O_3$: 13.1-16.5%, $Na_2O$: 11.5-15.5%, $K_2O$: 0.8-6%, MgO: 5-7.5%, $B_2O_3$: 0-1.0%, and $ZrO_2$: 0%. Its thickness (T) is greater than or equal to 2 mm and less than or equal to 4 mm; the chemical strengthening time t is greater than or equal to 4 hours and less than or equal to 150 hours; the chemical strengthening temperature is 400-450° C.; and the surface compressive stress value (CS) after chemical strengthening satisfies the relationship: $0.003t^2-2.167t+858 \le CS \le -61.4 Ln(t)+1060$, wherein Ln is the natural logarithm. After a certain time of chemical strengthening, for the two expressions of the endpoints, the values at that time are calculated respectively, and the surface compressive stress (CS) of the glass plate is between the two values.

The surface compressive stress (CS) is preferably 800 MPa or more and not more than 950 MPa, more preferably 850 MPa or more and not more than 950 MPa; the depth of compressive stress layer (DOL) is preferably 55 μm or more, more preferably 80 μm or more.

As a preferred technical solution, the thickness of the glass is greater than or equal to 2.5 mm and less than or equal to 3.5 mm.

In addition, as a technical solution of the present application, the composition for making the protective glass plate with the property of impact stress resistance, by mass percent, comprises: $SiO_2$: 59.5-62.5%, $Al_2O_3$: 13.8-15.8%, $Na_2O$: 11.5-15.5%, $K_2O$: 4.5-5.8%, MgO: 5-7.5%, $B_2O_3$: 0.4-0.6%, and $ZrO_2$: 0%.

As a preferred technical solution, the ratio of $K_2O$ to $Al_2O_3$ in the glass plate is less than or equal to 0.5; and the size of the maximum fragment for the broken glass is: 10-20 mm in length, and 1-2 mm in width.

The glass plate according to the present application is a glass plate obtained by chemically strengthening the plate glass prepared by mixing various raw materials according to the ratio.

The method for manufacturing the plate glass according to the present application is as follows: firstly after various of the components are mixed according to the ratio of each component in the material formula, the prepared raw material is heated and melted at a high temperature, and the melting temperature is 1500-1650° C., and finally the molten glass is formed. The molten glass is poured into a metal mold preheated to 550-700° C., putting the glass together with the metal mold into an annealing furnace for annealing and cooling. The annealing temperature is 630-650° C., remaining at this temperature for 30-60 minutes; then the temperature is naturally lowered to 120-80° C. to obtain the plate glass of the present application.

The chemical strengthening method is not particularly limited, as long as ion-exchange may be carried out between $Na_2O$ on the surface layer of the glass plate and $K_2O$ in the molten salt, for example, a method of immersing the glass plate in heated potassium nitrate ($KNO_3$) molten salt.

Components of the composition for making glass, ion exchange temperature and time are the main factors that affect the strength of ion exchange. Components of the composition for making glass and the content of each component have different effects on ion exchange. Hereinafter, the components of the composition for making the glass according to the present application will be described first, and the content of each component is expressed by mass percent.

$SiO_2$ is a component that constitutes the skeleton of glass and is essential. When the content of $SiO_2$ is less than 58%, the stability and hardness of glass are low, or the weather resistance is low; preferably the content of $SiO_2$ is 59% or more, more preferably 59.5% or more, and most preferably 59.8% or more. When the content of $SiO_2$ exceeds 65%, the viscosity of glass increases, and the meltability decreases; preferably the content of $SiO_2$ is 63.5% or less, more preferably 62.5% or less, and most preferably 61.6% or less.

$Al_2O_3$ is a component that increases the ion exchange rate and is essential. When it is less than 11.5%, the ion exchange rate is low. It is preferably 11.5% or more, more preferably 13.1% or more, most preferably 13.8% or more. When the content of $Al_2O_3$ exceeds 18%, the viscosity of the glass increases and homogeneous melting becomes difficult. It is preferably 16.5% or less, most preferably 15.8% or less.

$Na_2O$ is a component that forms a surface compressive stress layer by ion exchange and improves the meltability of glass, and is essential. When the content of $Na_2O$ is less than 10%, it is difficult to form a desired surface compressive stress layer by ion exchange; preferably the content of $Na_2O$ is 11.5% or more, more preferably 12.5% or more, and typically 12.8% or more. When the content of $Na_2O$ exceeds 16%, the strain point of glass decreases with Tg (glass transition temperature), or the weather resistance is low; preferably the content of $Na_2O$ is 15.5% or less, more preferably 14.8% or less, and typically 14.5% or less.

$K_2O$ is a component that may increase the transparency and gloss of glass, and improve the meltability of glass. It is also a component used to increase the ion exchange rate in chemical strengthening so as to obtain the desired CS and DOL, and is essential. When the content of $K_2O$ is less than 0.5%, the meltability is low, or the ion exchange rate is low; preferably the content of $K_2O$ is 0.8% or more, and typically 4.5% or more. When the content of $K_2O$ exceeds 7%, the weather resistance is low; preferably the content of $K_2O$ is 6% or less, and typically 5.8% or less.

MgO is a component that weakens the reduction of the ion exchange rate, and the glass is necessary to comprise at least 2% of MgO. When the content of MgO is less than 2%, the meltability of glass decreases; preferably the content of MgO is 4% or more, more preferably 5% or more, and typically 5.1% or more. When the content of MgO exceeds 10%, the ion exchange rate is low; preferably the content of MgO is 8.5% or less, more preferably 7.5% or less, and typically 7.2% or less.

The content of $B_2O_3$ may be 1% or less in order to improve the meltability or glass strength at high temperatures. If the content of $B_2O_3$ exceeds 1%, it may be difficult to obtain a homogeneous glass, and it may become difficult to form the glass; preferably the content of $B_2O_3$ is 0.7% or less, more preferably 0.6% or less; and preferably the content of $B_2O_3$ is 0.2% or more, more preferably 0.4% or more.

In a particular embodiment, the ratios of each component in Group 1 are shown in Table 1, $SiO_2$: 59-63.5%, $Al_2O_3$: 13.8-15.8%, $Na_2O$: 11.5-15.5%, $K_2O$: 3.1-5.8%, MgO: 4-8.5%, $B_2O_3$: 0-0.8%, and $ZrO_2$: 0%; wherein the content of $Al_2O_3$ is 13.8-15.8%, which is the most preferred content. $Al_2O_3$ may increase the ion exchange rate; and the viscosity of the glass within the above content range of $Al_2O_3$ is moderate, thereby facilitating homogeneous melting. The tempered glass prepared in this embodiment has a high single-point falling ball height and high impact resistance strength of the glass.

In a particular embodiment, the ratios of each component in Group 3 are shown in Table 1, $SiO_2$: 59-63.5%, $Al_2O_3$: 11.5-16.5%, $Na_2O$: 12.8-14.5%, $K_2O$: 3.1-5.8%, MgO: 4-8.5%, $B_2O_3$: 0-0.8%, and $ZrO_2$: 0%; wherein the content of $Na_2O$ is 12.8-14.5%, which is the most preferred content. $Na_2O$ may form the surface compressive stress layer of tempered glass; and the glass within the above content range of $Na_2O$ has high meltability and weather resistance, and the strain point of glass will not decrease with Tg (glass transition temperature). The tempered glass prepared in this embodiment has large surface compressive stress, large depth of the compressive stress layer, high single-point falling ball height, and high impact resistance strength of the glass.

In a particular embodiment, the ratios of each component in Group 9 are shown in Table 1, $SiO_2$: 59.5-62.5%, $Al_2O_3$: 13.5-16.3%, $Na_2O$: 11.5-15.5%, $K_2O$: 0.8-5.8%, MgO: 5.1-7.2%, $B_2O_3$: 0-1%, and $ZrO_2$: 0%; wherein the content of MgO is 5.1-7.2%, which is the most preferred content. MgO may weaken the reduction of the ion exchange rate; and the glass within the above content range of MgO has high meltability and slow reduction in ion exchange rate. The tempered glass prepared in this embodiment has good strengthening performance, large surface compressive stress and depth of stress layer, high single-point falling ball height, and good impact resistance strength of the glass.

EXAMPLES

Hereinafter, the present application will be further described in detail with reference to the Examples, but the embodiments of the present application are not limited thereto.

According to the ratios of each component in Examples 1-7 in Table 1, the glass plates with different component contents are obtained. At the same time, the ratios of each component in Comparative Examples 1-5 are also given.

TABLE 1

| Number | SiO$_2$ | Al$_2$O$_3$ | Na$_2$O | K$_2$O | MgO | B$_2$O$_3$ | K$_2$O/Al$_2$O$_3$ |
|---|---|---|---|---|---|---|---|
| 1 | 59 | 15.6 | 11.5 | 5.8 | 7.9 | 0.2 | 0.37 |
| 2 | 60.5 | 14.8 | 15.5 | 5.1 | 4 | 0.1 | 0.34 |
| 3 | 63.5 | 11.5 | 14.4 | 4.2 | 5.6 | 0.8 | 0.37 |
| 4 | 60.6 | 15.8 | 14.5 | 4.5 | 4.6 | 0 | 0.28 |
| 5 | 61.3 | 16.5 | 12.8 | 0.9 | 8.5 | 0 | 0.05 |
| 6 | 62.5 | 13.8 | 13.7 | 0.8 | 8.2 | 1 | 0.06 |
| 7 | 60.3 | 12.6 | 12.8 | 6 | 7.8 | 0.5 | 0.48 |
| 8 | 60.4 | 13.5 | 13.3 | 5.9 | 6.9 | 0 | 0.44 |
| 9 | 62.3 | 16.1 | 15 | 0.9 | 5.7 | 0 | 0.06 |
| 10 | 62.8 | 14.9 | 13.9 | 3.6 | 4.8 | 0 | 0.24 |
| 11 | 58 | 9 | 16.4 | 7.5 | 8.2 | 0.9 | 0.83 |
| 12 | 62.5 | 10 | 15.8 | 6.5 | 5.2 | 0 | 0.65 |
| 13 | 64.5 | 13.5 | 16.6 | 0.4 | 4.2 | 0.8 | 0.03 |
| 14 | 61.8 | 14.5 | 5.9 | 7.8 | 9.8 | 0.2 | 0.54 |
| 15 | 62.2 | 18 | 12.5 | 5.4 | 0.7 | 1.2 | 0.30 |
| 16 | 56.4 | 15.5 | 14.5 | 5.8 | 7.8 | 0 | 0.37 |
| 17 | 62.7 | 9.6 | 14.8 | 4.5 | 8.2 | 0.2 | 0.47 |
| 18 | 62.4 | 14.5 | 10.2 | 5.2 | 7.6 | 0.1 | 0.36 |
| 19 | 63.2 | 15.8 | 13.3 | 0.5 | 7.2 | 0 | 0.03 |
| 20 | 60.5 | 13.8 | 11.8 | 4.1 | 9.6 | 0.2 | 0.30 |
| 21 | 61.6 | 14.2 | 12.6 | 5.6 | 4.5 | 1.5 | 0.39 |

1. The specific preparation process of the glass plates of a group of Examples and Comparative Examples is as follows: firstly mixing various components with the ratios of each component in the above Table 1; at the same time, putting the mixed raw material into a sealed bag, mixing well in the sealed bag, and pouring it into a platinum crucible to melt; then putting the platinum crucible into a GWL-1600TS high-temperature melting furnace to melt at a temperature of 1620° C.; pouring the molten glass into a metal mold, and putting the glass together with the metal mold into the annealing furnace for precision annealing and cooling at a temperature of 630° C., and remaining at this temperature for 30 minutes; then naturally cooling the temperature to 40° C., a glass with the thickness of Table 2 is obtained. Then the glass is cut and ground into small samples of 50 mm×50 mm and 100 mm×80 mm. For each type of glass, 20 pieces of samples of the two sizes are produced. Finally, chemical strengthening is performed in molten salt of potassium nitrate according to the chemical strengthening conditions in Table 2, the glass plates of Examples A1-A10 and Comparative Examples A11-A21 are respectively obtained.

TABLE 2

| Number | Glass thickness (mm) | Chemical strengthening conditions |
|---|---|---|
| Example A1 | 1.5 | 380° C., 8 h |
| Example A2 | 1.5 | 380° C., 6 h |
| Example A3 | 1.1 | 380° C., 5 h |
| Example A4 | 1.0 | 400° C., 5 h |
| Example A5 | 1.0 | 400° C., 4.5 h |
| Example A6 | 0.8 | 420° C., 4 h |
| Example A7 | 0.7 | 420° C., 3.5 h |
| Example A8 | 0.7 | 450° C., 2 h |
| Example A9 | 0.55 | 450° C., 1 h |
| Example A10 | 0.5 | 450° C., 0.5 h |
| Comparative Example A11 | 1.5 | 380° C., 8 h |
| Comparative Example A12 | 1.0 | 400° C., 5 h |
| Comparative Example A13 | 0.8 | 420° C., 4 h |
| Comparative Example A14 | 0.7 | 450° C., 2 h |
| Comparative Example A15 | 0.5 | 450° C., 0.5 h |
| Comparative Example A16 | 1.5 | 360° C., 8 h |
| Comparative Example A17 | 1.0 | 370° C., 5 h |
| Comparative Example A18 | 0.8 | 420° C., 0.4 h |
| Comparative Example A19 | 0.7 | 450° C., 0.4 h |
| Comparative Example A20 | 0.5 | 450° C., 0.3 h |
| Comparative Example A21 | 0.5 | 450° C., 0.2 h |

When 0.3 mm<T<2.0 mm, and 0.5 h≤t≤8 h. CS satisfies the following relationship (I):

$$9.597 \mathrm{Ln}(t)+710 \leq CS \leq -5.299 t^2 + 50.28 t + 765;$$

wherein T is the thickness of the glass plate and has the unit of mm; t is the chemical strengthening time and has the unit of h; CS is the surface compressive stress generated by chemical strengthening and has the unit of MPa; and Ln is the natural logarithm.

Table 3 shows the first and last values of the range of the surface compressive stress (CS) for the glass within the thickness range calculated according to the above relational formula (1) after chemically strengthening for the following time.

TABLE 3

| Chemical strengthening time (h) | 9.597Ln(t) + 710 | −5.299t$^2$ + 50.28t + 765 |
|---|---|---|
| 8 | 730 | 828.1 |
| 6 | 727.2 | 875.9 |
| 5 | 725.4 | 883.9 |
| 4.5 | 724.4 | 884 |
| 4 | 723.3 | 881.3 |
| 3.5 | 722 | 876.1 |
| 2 | 716.7 | 844.4 |
| 1 | 710 | 810 |
| 0.5 | 703.3 | 788.8 |

After chemically strengthening each small sample with a size of 50 mm×50 mm in various Examples and Comparative Examples, the surface compressive stress (CS) of each sample is measured with a chemical stress tester FSM-6000; and the detailed test results are shown in Table 4.

TABLE 4

| Number | Surface compressive stress (CS) (MPa), average value of 20 pieces | Depth of compressive stress layer (DOL) (μm), average value of 20 pieces |
|---|---|---|
| Example A1 | 805 | 40 |
| Example A2 | 815 | 38 |
| Example A3 | 825 | 36 |
| Example A4 | 832 | 35 |
| Example A5 | 856 | 33 |
| Example A6 | 854 | 32 |
| Example A7 | 796 | 37 |
| Example A8 | 788 | 38 |
| Example A9 | 782 | 37 |
| Example A10 | 710 | 32 |
| Comparative Example A11 | 780 | 38 |
| Comparative Example A12 | 795 | 32 |
| Comparative Example A13 | 810 | 29 |
| Comparative Example A14 | 778 | 35 |
| Comparative Example A15 | 708 | 28 |
| Comparative Example A16 | 798 | 34 |
| Comparative Example A17 | 786 | 35 |
| Comparative Example A18 | 745 | 27 |
| Comparative Example A19 | 756 | 18 |
| Comparative Example A20 | 774 | 32 |
| Comparative Example A21 | 689 | 31 |

It can be seen from Table 4 that, in case that the chemical strengthening conditions and the glass thickness are basically the same, compared with the Comparative Examples, the surface compressive stress of the glass plate in the Examples of the present application may be increased by up to 5.5%, and the depth of compressive stress layer is obviously increased, up to 18%.

After chemically strengthening each small sample with a size of 100 mm×80 mm in various Examples and Comparative Examples, a single-point falling ball test is performed with a falling ball tester MK-9968. A 130 g steel ball is used for single-point multiple falling ball test, with 15 cm of base height, 3 times of center-point falling ball, rising 5 cm for each time until the glass is broken. 20 pieces of each sample are tested, and the detailed test results are shown in Table 5.

TABLE 5

| Number | Single-point falling ball height (cm), average value of 20 pieces |
|---|---|
| Example A1 | 70 |
| Example A2 | 65 |
| Example A3 | 60 |
| Example A4 | 55 |
| Example A5 | 55 |
| Example A6 | 50 |
| Example A7 | 45 |
| Example A8 | 45 |
| Example A9 | 45 |
| Example A10 | 40 |
| Comparative Example A11 | 20 |
| Comparative Example A12 | 25 |
| Comparative Example A13 | 25 |
| Comparative Example A14 | 30 |
| Comparative Example A15 | 30 |
| Comparative Example A16 | 30 |
| Comparative Example A17 | 35 |
| Comparative Example A18 | 25 |
| Comparative Example A19 | 25 |
| Comparative Example A20 | 30 |
| Comparative Example A21 | 20 |

It can be seen from Table 5 that, in case that the chemical strengthening conditions and the glass thickness are basically the same, compared with the Comparative Examples, the single-point falling ball height of the glass plate in the Examples of the present application may increase by 50%-250%.

It can be seen from Table 4 and Table 5 that, in case that the chemical strengthening conditions and the glass thickness are basically the same, the surface compressive stress (CS), the depth of stress layer (DOL), and the single-point falling ball height of the glass plates with various components shown in Examples A1-A10 according to the present application is higher than that of the glass plates in the Comparative Examples. Although the Comparative Examples A11-A21 are strengthened with different chemical strengthening conditions, the surface compressive stress (CS) still satisfies the stress relationship given by the present application, which directly proves the rationality of this relationship. Furthermore, although the Comparative Examples A11-A21 satisfy the stress relationship, the contents of their components deviate from the corresponding range values given by the present application; and it can be seen from the falling ball test that the impact resistance of the glass plates of the Comparative Examples A1-A21 is relatively poor.

2. The specific preparation process of the glass plates of another group of Examples and Comparative Examples is as follows: firstly mixing various components with the ratios of each component in the above Table 1; at the same time, putting the mixed raw material into a sealed bag, mixing well in the sealed bag, and pouring it into a platinum crucible to melt; then putting the platinum crucible into a GWL-1600TS high-temperature melting furnace to melt at a temperature of 1620° C.; pouring the molten glass into a metal mold, and putting the glass together with the metal mold into the annealing furnace for precision annealing and cooling at a temperature of 630° C., and remaining at this temperature for 30 minutes; then naturally cooling the temperature to 40° C., a glass with the thickness of Table 6 is obtained. Then the glass is cut and ground into small samples of 50 mm×50 mm, 20 pieces for each type of glass sample. Finally, chemical strengthening is performed in molten salt of potassium nitrate according to the chemical strengthening conditions in Table 6, the glass plates of Examples B1-B10 and Comparative Examples B11-B21 are respectively obtained.

TABLE 6

| Number | Glass thickness (mm) | Chemical strengthening conditions |
|---|---|---|
| Example B1 | 4.0 | 400° C., 150 h |
| Example B2 | 4.0 | 400° C., 120 h |
| Example B3 | 3.5 | 410° C., 100 h |
| Example B4 | 3.5 | 410° C., 90 h |
| Example B5 | 3.0 | 420° C., 70 h |
| Example B6 | 3.0 | 420° C., 50 h |
| Example B7 | 2.5 | 430° C., 30 h |
| Example B8 | 2.5 | 430° C., 10 h |
| Example B9 | 2.0 | 440° C., 8 h |
| Example B10 | 2.0 | 450° C., 8 h |
| Comparative Example B11 | 4.0 | 400° C., 150 h |
| Comparative Example B12 | 3.5 | 410° C., 100 h |
| Comparative Example B13 | 3.0 | 420° C., 50 h |
| Comparative Example B14 | 2.5 | 430° C., 30 h |
| Comparative Example B15 | 2.0 | 450° C., 10 h |
| Comparative Example B16 | 4.0 | 350° C., 150 h |
| Comparative Example B17 | 3.5 | 360° C., 100 h |
| Comparative Example B18 | 3.0 | 370° C., 50 h |
| Comparative Example B19 | 2.5 | 380° C., 30 h |
| Comparative Example B20 | 2.0 | 390° C., 10 h |
| Comparative Example B21 | 2.0 | 390° C., 5 h |

When 2.0 mm≤T≤4.0 mm, and 4 h≤t≤150 h, CS satisfies the following relationship (2):

$$0.003t^2 - 2.167t + 858 \leq CS \leq -61.4\operatorname{Ln}(t) + 1060;$$

wherein T is the thickness of the glass plate and has the unit of mm; t is the chemical strengthening time and has the unit of h; CS is the surface compressive stress generated by chemical strengthening and has the unit of MPa; and Ln is the natural logarithm.

Table 7 shows the first and last values of the range of the surface compressive stress (CS) for the glass within the thickness range calculated according to the above relational formula (2) after chemically strengthening for the following time.

TABLE 7

| Chemical strengthening time (h) | $0.003t^2 - 2.167t + 858$ | $-61.4\operatorname{Ln}(t) + 1060$ |
|---|---|---|
| 150 | 600.5 | 752.3 |
| 120 | 641.2 | 766.0 |
| 100 | 671.3 | 777.2 |
| 90 | 687.3 | 783.7 |
| 70 | 721.0 | 799.1 |
| 50 | 757.2 | 819.8 |
| 30 | 795.7 | 851.2 |

TABLE 7-continued

| Chemical strengthening time (h) | $0.003t^2 - 2.167t + 858$ | $-61.4\mathrm{Ln}(t) + 1060$ |
|---|---|---|
| 10 | 836.6 | 918.6 |
| 8 | 840.9 | 932.3 |

After chemically strengthening each small sample with a size of 50 mm×50 mm in various Examples and Comparative Examples, the surface compressive stress (CS) of each sample is measured with a chemical stress tester FSM-6000; and the detailed test results are shown in Table 8.

TABLE 8

| Number | Surface compressive stress (CS) (MPa), average value of 20 pieces | Depth of compressive stress layer (DOL) (μm), average value of 20 pieces |
|---|---|---|
| Example B1 | 660 | 166 |
| Example B2 | 672 | 158 |
| Example B3 | 698 | 147 |
| Example B4 | 710 | 145 |
| Example B5 | 742 | 137 |
| Example B6 | 801 | 121 |
| Example B7 | 831 | 102 |
| Example B8 | 872 | 76 |
| Example B9 | 902 | 58 |
| Example B10 | 915 | 62 |
| Comparative Example B11 | 610 | 142 |
| Comparative Example B12 | 680 | 134 |
| Comparative Example B13 | 782 | 110 |
| Comparative Example B14 | 802 | 91 |
| Comparative Example B15 | 856 | 59 |
| Comparative Example B16 | 624 | 132 |
| Comparative Example B17 | 650 | 112 |
| Comparative Example B18 | 791 | 96 |
| Comparative Example B19 | 815 | 86 |
| Comparative Example B20 | 840 | 62 |
| Comparative Example B21 | 875 | 48 |

It can be seen from Table 8 that, in case that the chemical strengthening conditions and glass thickness are basically the same, compared with the Comparative Examples, the surface compressive stress (CS) of the glass plates shown in Examples B1-B10 of the present application may be increased by up to 8.5%, and the depth of compressive stress layer (DOL) may be increased by up to 32%. Although the glass plates of the Comparative Examples B11-B21 are strengthened with different chemical strengthening conditions, the surface compressive stress (CS) still satisfies the stress relationship given by the present application.

It can also be seen from the comparison of the Examples and Comparative Examples in Table 8 that, the chemical strengthening temperature and time are important factors affecting the strength of the glass. The higher the chemical strengthening temperature and the longer the strengthening time, the stronger the strength of the glass and the better the impact resistance will be. In actual production, it is necessary to select the most suitable chemical strengthening conditions on the basis of time cost and process cost, so as to obtain chemically strengthened glass with excellent performance.

3. Various components with the ratios of each component in Group 8 in the above Table 1 are mixed, at the same time, putting the mixed raw material into a sealed bag, mixing well in the sealed bag, and pouring it into a platinum crucible to melt; pouring the molten glass into a metal mold, and putting the glass together with the metal mold into the annealing furnace for precision annealing and cooling; then a glass with the thickness of Table 9 is obtained. Then the glass is cut and ground into small samples of 50 mm×50 mm and 145 mm×80 mm; wherein 20 pieces of the glass with a size of 50 mm×50 mm for each Example are produced, and 5 pieces of the glass with a size of 145 mm×80 mm for each Example are produced. Finally, chemical strengthening is respectively performed in molten salt of potassium nitrate according to the chemical strengthening conditions in Table 9.

TABLE 9

| Number | Glass thickness (mm) | Chemical strengthening conditions |
|---|---|---|
| Example 8-1 | 2.0 | 420° C., 4 h |
| Example 8-2 | 2.0 | 420° C., 18 h |
| Example 8-3 | 2.0 | 420° C., 48 h |
| Example 8-4 | 2.0 | 420° C., 72 h |
| Example 8-5 | 2.0 | 420° C., 96 h |
| Example 8-6 | 2.0 | 420° C., 144 h |
| Example 8-7 | 3.0 | 420° C., 4 h |
| Example 8-8 | 3.0 | 420° C., 18 h |
| Example 8-9 | 3.0 | 420° C., 48 h |
| Example 8-10 | 3.0 | 420° C., 72 h |
| Example 8-11 | 3.0 | 420° C., 96 h |
| Example 8-12 | 3.0 | 420° C., 144 h |

Table 10 shows the first and last values of the range of the surface compressive stress (CS) for the glass within the thickness range calculated according to the above relational formula (2) after chemically strengthening for the following time.

TABLE 10

| Chemical strengthening time (h) | $0.003t^2 - 2.167t + 858$ | $-61.4\mathrm{Ln}(t) + 1060$ |
|---|---|---|
| 4 | 849.4 | 974.9 |
| 18 | 820.0 | 882.5 |
| 48 | 760.9 | 822.3 |
| 72 | 717.5 | 797.4 |
| 96 | 677.6 | 779.7 |
| 144 | 608.2 | 754.9 |

After chemically strengthening each of the small glass samples with a size of 50 mm×50 mm in Examples 8-1 to 8-12, the surface compressive stress (CS) of each sample is measured with a chemical stress tester FSM-6000, and the detailed test results are shown in Table 11.

TABLE 11

| Number | Surface compressive stress (CS) (MPa), average value of 20 pieces | Depth of compressive stress layer (DOL) (μm), average value of 20 pieces |
|---|---|---|
| Example 8-1 | 932 | 42 |
| Example 8-2 | 857 | 91 |
| Example 8-3 | 803 | 128 |
| Example 8-4 | 741 | 139 |
| Example 8-5 | 693 | 148 |
| Example 8-6 | 652 | 161 |
| Example 8-7 | 921 | 42 |
| Example 8-8 | 846 | 90 |
| Example 8-9 | 796 | 126 |
| Example 8-10 | 740 | 138 |
| Example 8-11 | 681 | 145 |
| Example 8-12 | 651 | 162 |

After chemically strengthening each small sample with a size of 145 mm×80 mm in various Examples, a single-point falling ball test is performed with a falling ball tester MK-9968. A 512 g steel ball is used for single-point multiple falling ball test, with 60 cm of base height, performing center-point falling ball until the glass is broken. 5 pieces of each sample are tested, finally recording the form of the glass and the size of maximum fragment of the broken glass. The detailed test results are shown in Table 12, as well as FIGS. 1-2.

TABLE 12

| Number | Glass thickness (mm) | Chemical strengthening conditions | Size of maximum fragment (length * width), unit: mm |
|---|---|---|---|
| Example 8-1 | 2.0 | 420° C., 4 h | 30*1.0 |
| Example 8-2 | 2.0 | 420° C., 18 h | 25*2.0 |
| Example 8-3 | 2.0 | 420° C., 48 h | 17*1.0 |
| Example 8-4 | 2.0 | 420° C., 72 h | 14*1.5 |
| Example 8-5 | 2.0 | 420° C., 96 h | 12*1.0 |
| Example 8-6 | 2.0 | 420° C., 144 h | 10*1.0 |
| Example 8-7 | 3.0 | 420° C., 4 h | 43*4.0 |
| Example 8-8 | 3.0 | 420° C., 18 h | 30*3.0 |
| Example 8-9 | 3.0 | 420° C., 48 h | 25*3.0 |
| Example 8-10 | 3.0 | 420° C., 72 h | 24*3.0 |
| Example 8-11 | 3.0 | 420° C., 96 h | 23*2.0 |
| Example 8-12 | 3.0 | 420° C., 144 h | 21*3.0 |

Figure 1:
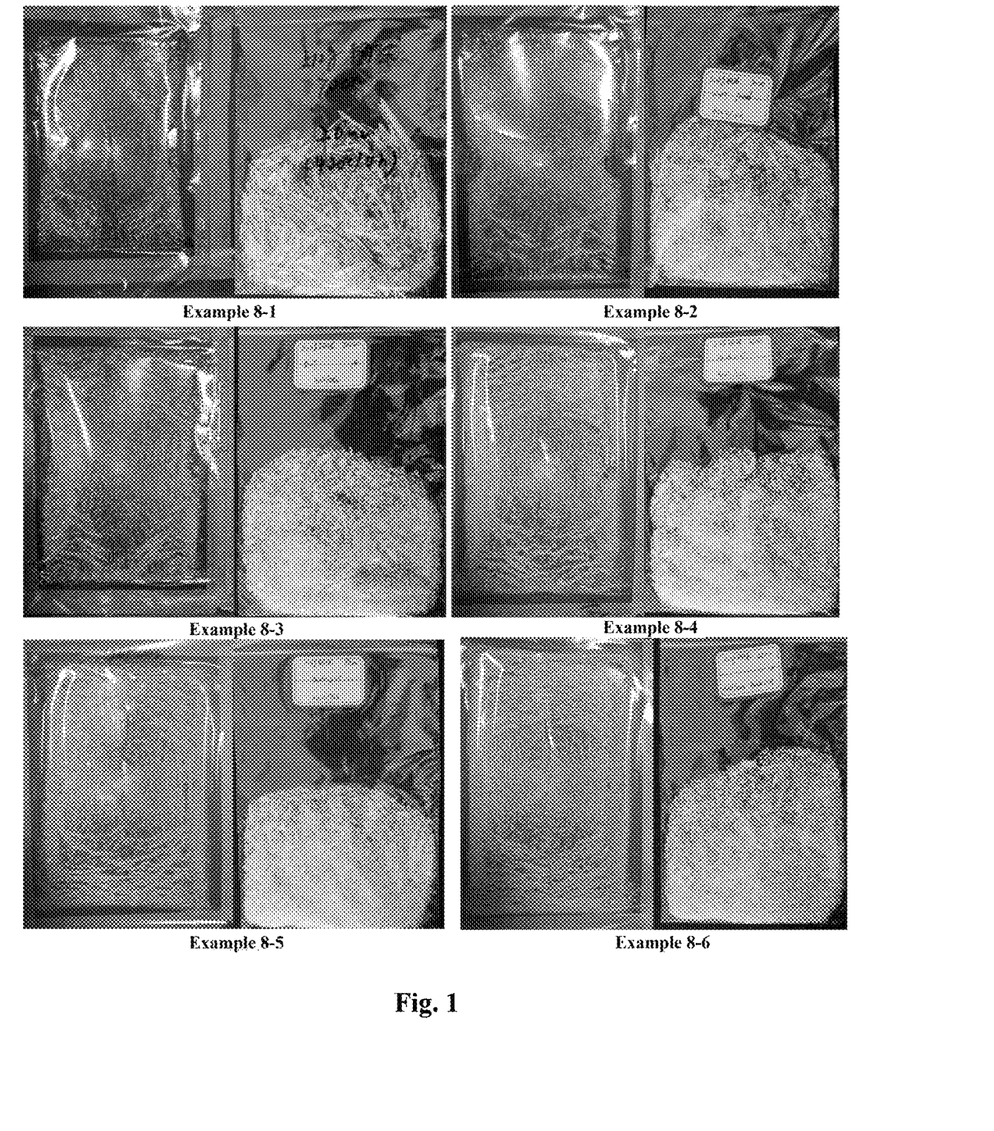
FIG. 1 is the pictures of the glass fragmentation effect in the falling ball tests of Examples 8-1 to 8-6.
Figure 2:
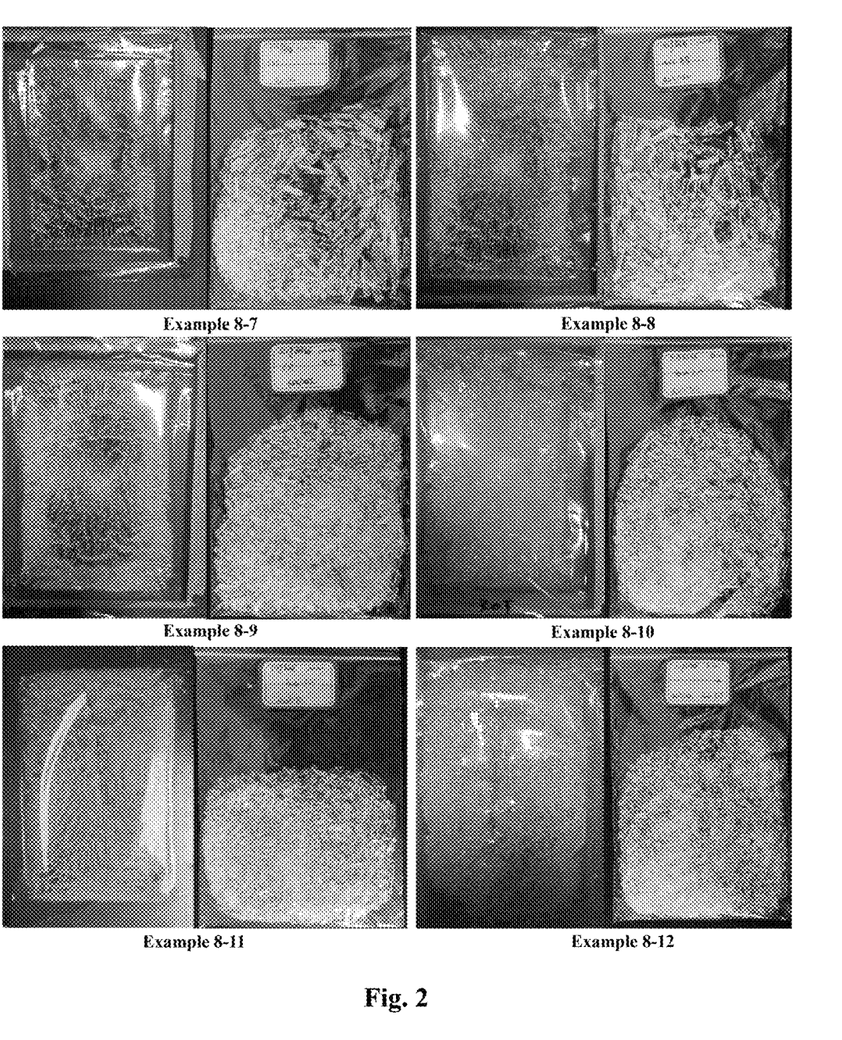
FIG. 2 is the pictures of the glass fragmentation effect in the falling ball tests of Examples 8-7 to 8-12.

It can be seen from Table 12 and FIGS. 1-2 that, for the broken glass having the components of the present application, the size of the glass strip or powder particle decreases with the increase of the ion exchange time (t), and the size of the glass fragments may be controlled in the range of: 10-30 mm in length and 1-3 mm in width.

The invention claimed is:

1. A protective glass plate with the property of impact stress resistance, wherein the composition for making the glass plate comprises the following components by mass percent: $SiO_2$: 59-63.5%, $Al_2O_3$: 11.5-16.5%, $Na_2O$: 11.5-15.5%, $K_2O$: 4.2-5.8%, MgO: 7.9-8.5%, $B_2O_3$: 0.1-0.8%, and $ZrO_2$: 0%;

the ratio of $K_2O/Al_2O_3$ in the composition for making the glass plate should not be greater than 0.5;

when 2.5 mm≤T<3.5 mm, and 4h≤t≤150h, CS satisfies the following relationship:

$$0.003t^2 - 2.167t + 858 \leq CS \leq -61.4\text{Ln}(t) + 1060;$$

wherein T is the thickness of the glass plate and has the unit of mm; t is the chemical strengthening time and has the unit of h; and CS is the surface compressive stress generated by chemical strengthening and has the unit of MPa.

2. The protective glass plate according to claim 1, wherein the composition for making the glass plate comprises $B_2O_3$: 0.2-0.7% by mass percent.

3. The protective glass plate according to claim 1, wherein tempering temperature is 400-450° C.

4. The glass plate according to claim 1, wherein the ratio of $K_2O/Al_2O_3$ in the composition for making the glass plate should not be greater than 0.35.

5. The glass plate according to claim 1, wherein the maximum fragment size of a broken glass plate is: 10-30 mm in length, and 1-3 mm in width.

6. The protective glass plate according to claim 1, wherein tempering temperature is 420° C.

7. The glass plate according to claim 1, wherein the maximum fragment size of a broken glass plate is: 10-20 mm in length, and 1-2 mm in width.

8. The glass plate according to claim 1, wherein the composition for making the glass plate comprises the following components by mass percent: $SiO_2$: 59%, $Al_2O_3$: 15.6%, $Na_2O$: 11.5%, $K_2O$: 5.8%, MgO: 7.9%, $B_2O_3$: 0.2%, and $ZrO_2$: 0%; and the ratio of $K_2O/Al_2O_3$ in the composition for making the glass plate is 0.37.

9. The protective glass plate according to claim 3, wherein tempering temperature is 410-420° C.

* * * * *